(12) United States Patent
Chu et al.

(10) Patent No.: US 7,872,991 B2
(45) Date of Patent: Jan. 18, 2011

(54) METHODS AND SYSTEMS FOR PROVIDING MPLS-BASED LAYER-2 VIRTUAL PRIVATE NETWORK SERVICES

(75) Inventors: Thomas P. Chu, Englishtown, NJ (US); Francis R. Magee, Lincroft, NJ (US); Steven H. Richman, Marlboro, NJ (US); ZhengXue Zhao, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1408 days.

(21) Appl. No.: 10/357,358

(22) Filed: Feb. 4, 2003

(65) Prior Publication Data

US 2004/0151181 A1 Aug. 5, 2004

(51) Int. Cl.
*H04L 12/28* (2006.01)
(52) U.S. Cl. ..................................... 370/256
(58) Field of Classification Search ............ None
See application file for complete search history.

(56) References Cited

U.S. PATENT DOCUMENTS

| | | | | |
|---|---|---|---|---|
| 5,018,137 A * | 5/1991 | Backes et al. | ............... | 370/401 |
| 5,825,772 A * | 10/1998 | Dobbins et al. | ............. | 370/396 |
| 6,535,490 B1 * | 3/2003 | Jain | ............ | 370/256 |
| 6,771,662 B1 * | 8/2004 | Miki et al. | .................. | 370/469 |
| 6,895,441 B1 * | 5/2005 | Shabtay et al. | .............. | 709/238 |
| 6,970,464 B2 * | 11/2005 | Xu et al. | ..................... | 370/392 |
| 7,039,687 B1 * | 5/2006 | Jamieson et al. | ............ | 709/220 |
| 7,061,876 B2 * | 6/2006 | Ambe | ........................ | 370/256 |
| 7,065,573 B2 * | 6/2006 | Byrnes | ....................... | 709/224 |
| 7,082,102 B1 * | 7/2006 | Wright | ....................... | 370/229 |
| 7,180,866 B1 * | 2/2007 | Chartre et al. | ............. | 370/242 |
| 7,206,308 B2 * | 4/2007 | Koehl et al. | ................. | 370/386 |
| 2002/0075805 A1 * | 6/2002 | Gupta et al. | ................ | 370/235 |
| 2003/0142669 A1 * | 7/2003 | Kubota et al. | ............... | 370/389 |
| 2004/0042396 A1 * | 3/2004 | Brown et al. | ................ | 370/227 |
| 2004/0081171 A1 * | 4/2004 | Finn | ..................... | 370/395.53 |
| 2007/0206492 A1 * | 9/2007 | Zelig et al. | .................. | 370/218 |

\* cited by examiner

*Primary Examiner*—Chi H Pham
*Assistant Examiner*—Mohammad S Adhami
(74) *Attorney, Agent, or Firm*—Capital Patent & Trademark Law Firm, PLLC

(57) ABSTRACT

Methods and systems for forwarding packets over Label Switched Paths (LSPs) in a Virtual Private Network (VPN) are implemented within a Layer-2 architecture. A system includes a number of multi-purpose nodes connected by a number of multi-protocol label switching (MPLS) LSP links. Each multi-purpose node contains at least one bridging module (BM) that runs an extension of a bridging protocol (BP) contained in the IEEE 802.1d standard. The BP is used to establish MPLS LSPs between the BMs. The BP then generates a spanning tree using a spanning tree program to establish an optimal number of active LSPs. The remaining LSPs are then set to "inactive" The BM de-allocates the resources assigned to inactive LSPs and makes the resources available to other active LSPs.

29 Claims, 12 Drawing Sheets

| PEER NODE IDENTIFIER | PEER BM IDENTIFIER | EXTERIOR LABEL RECEIVING | EXTERIOR LABAEL TRANSMITTING | INTERIOR LABEL RECEIVING | INTERIOR LABAEL TRANSMITTING | GRADE OF SERVICE |
|---|---|---|---|---|---|---|
| ... | ... | ... | ... | ... | ... | ... |
| 705 | 710 | 715 | 720 | 725 | 730 | 735 |

FIG. 7

| DESTINATION MAC ADDRESS | PEER NODE IDENTIFIER | PEER BM IDENTIFIER | LOCAL EXTERIOR LABEL | INTERIOR LABEL | LOCAL INTERFACE |
|---|---|---|---|---|---|
| ... | ... | ... | ... | ... | ... |
| 805 | 810 | 815 | 820 | 825 | 830 |

FIG. 8

METHODS AND SYSTEMS FOR PROVIDING MPLS-BASED LAYER-2 VIRTUAL PRIVATE NETWORK SERVICES

TECHNICAL FIELD

This invention relates to techniques for providing Layer-2 Virtual Private Network (VPN) services by routing data packets (hereinafter "packets") in a distributed network, and more particularly, by routing packets using multi-protocol label switching (MPLS) switched paths.

BACKGROUND OF THE INVENTION

Advances in the processing of so-called "packets" of information have led to the introduction of a number of multiple service platforms (a platform is either hardware, software, or a combination of the two) in the marketplace. Many multi-service providers, e.g., telephone companies, are interested in this new generation of multi-service platforms because of their ability to support low cost, high performance Gigabyte Ethernet and 10 Gigabyte Ethernet technologies. Ethernet based technologies offer a number of advantages, such as low cost, flexible architecture, flexible bandwidth, and a greater number of data services when compared to traditional TDM-based technologies such as SONET/SDH. Additionally, multi-service platforms allow the use of simpler, less expensive access equipment at a customer's site, e.g., inexpensive Layer-2 Ethernet devices and Layer-2-Layer-3 combination devices. Another advantage to Ethernet-based technologies is that the technology is widely known and deployed in local area networks. This results in lower cost and a wide selection of vendors. These platforms can forward packets based on both Layer 3 header information, e.g., IP, and Layer 2 header information (Ethernet MAC address, MPLS labels, etc.), and have enhanced traffic management capabilities. Based on these capabilities, packets may have different grades of quality of service (QoS) associated with them.

The simplest service to provide is a point-to-point connection between two subscriber interfaces. Packets from one interface are forwarded to another without modification (and vice versa). MPLS is considered to be the best technology to carry out point-to-point connections. In MPLS, a label is attached to each packet. The packet is then routed through the network to a terminal interface based on this label. The path that the packet takes is referred to as the "Label Switched Path" (LSP). As the packet travels through the network, the value of its label can be modified by each multi-purpose node it passes through. An LSP can be established using a "Label Distribution Protocol" (LDP). Two commonly used LDPs are "Resource Reservation Protocol with Traffic Engineering Extension" (RSVP-TE) and "Constraint Based" LDP (CR-LDP).

As MPLS packets are routed, network nodes may treat them differently depending on the value of certain bits within the label. For example, some packets may contain bits that identify them as high priority. The capability to track packets differently allows service providers to offer different QoS grades to their customers. To simplify the transmission of packets through a network, multiple LSPs between two MPLS nodes can be aggregated into a single, larger LSP by adding another MPLS label in front of the packet. This aggregation of LSPs offers several advantages. First, a "transit" node only needs to look at the exterior label because the exterior label contains information on the address of a "recipient" node. Second, network resources can be assigned to the aggregate LSP instead of the individual LSPs, which simplifies the management of the network. Aggregation of LSPs allows LSPs to share network resources, which is known as "statistical multiplexing."

One Layer-2 service is "transparent" LAN service (TLS). TLS allows a network to appear as a segment of a larger LAN. A service provider provides TLS to its customer networks, where each customer network (e.g., a campus-like network) is logically separated from each other. Campus-like networks are commonly configured as Layer-2 virtual private networks (VPNs). The service they provide is referred to as a Layer-2 VPN service. An advantage of Layer-2 VPN service, compared to Layer-3 VPN service, is that it simplifies Layer-3 address administration (the dominant Layer 3 is Internet Protocol (IP)). The entire VPN can operate as a single Layer-3 subnet. Such Layer-2 service can support multiple Layer-3 protocols (more than just IP). With the introduction of new computer platforms and the abundant availability of high-speed connectivity, service providers are attempting to extend TLS service to networks other than campus-like networks, for example, to metropolitan-like networks.

The traditional method of implementing TLS is by using a number of bridging modules (BM) to form a network. To ensure reliability, each segment of a LAN is connected to multiple BMs. Similarly, each BM can be connected through multiple LAN connections. In order to avoid loops, only certain connections are "active." The topographical configuration of a network showing its active connections is commonly referred as a "spanning tree" (e.g., such as that which is specified in the IEEE 802.1d standard). The IEEE 802.1d standard uses a protocol, know as the Bridge Protocol (BP), between BMs to determine the spanning tree of a network. Messages transferred using the BP are referred to as "bridge protocol data unit" (BPDU) messages.

In a traditional Layer-2 bridging network, the BMs are connected to one another through dedicated connections. Although they form a network, the BMs usually are not physically connected with each other. A spanning tree program ensures that all BMs are connected in an optimal manner. For instance, if all nodes are MPLS enabled, then all BMs can be directly connected through LSP tunnels.

It is desirable to develop improved techniques for ensuring that BMs are optimally connected. One suggested method is to directly connect all the BMs to one another through MPLS LSPs, alleviating the need of a spanning tree. However, this solution does not scale well. The network resources assigned to support each connection and the associated network costs are unacceptable because they exceed revenue. For example, a Layer-2 VPN with 4 nodes requires 6 bi-directional connections, and a Layer-2 VPN with 8 nodes requires 28 bi-directional connections. In general, a network with N nodes would require N*(N−1)/2 bidirectional connections (i.e., the number of connections grows at a rate proportional to the square of the number of nodes, N.)

Therefore, there is a need for techniques which make the use of MPLS LSPs more practical. In particular, there is a need for techniques that are capable of managing MPLS LSP connections within a VPN in order to reduce network costs, allow for better network management, and provide improved network throughput.

SUMMARY OF THE INVENTION

The present invention envisions meeting the needs described above by offering MPLS-based Layer-2 VPN services. Generally described, the invention includes techniques for forwarding packets over LSPs in a VPN implemented within a Layer-2 architecture. The system includes a number of multi-purposes nodes, which are interconnected by LSP links. Typically, LSPs are uni-directional links. However, as envisioned by the present invention, one LSP is used to indicate a pair of LSP links, one in each direction. Each multi-purpose node contains at least one BM capable of establishing a MPLS LSP between BMs at other nodes. Each LSP between a BM has associated with it a finite amount of resources, e.g., bandwidth, for transferring packets. Each BM is also capable of generating a spanning tree using a spanning tree program used to establish the optimal number of active LSPs among the VPN for transferring packets between the plurality of BMs. The spanning tree program is also capable of determining each inactive LSP. Once the inactive LSP are determined, the BM may then de-allocate any resources assigned to the inactive LSPs and reassign these resources to active LSPs.

One way in which the BMs de-allocate resources is to re-allocate the resources associated with an inactive LSP to another active LSP of any BM at the same node. The BM connected to the inactive LSP does, however, retain just enough bandwidth to maintain a control channel for transmitting control signals between BMs.

The present invention further includes techniques for de-allocating resources associated with each inactive link. A determination is made as to whether an LSP connection is either active or inactive. A spanning tree program selects one BM of an LSP as the designated BM. Once it is determined that a particular LSP is inactive, a non-designated BM sends a control message to the designated BM. The control message includes a resource flag that indicates the status of the LSP. If the resource flag is set to a first value, then the LSP is active and the designated BM can receive packets over the particular LSP. However, if the resource flag is set to a second value, which indicates that the LSP is inactive, then the designated BM is unable to receive packets over the particular LSP.

Various aspects of the present invention may be more clearly understood and appreciated from a review of the following detailed description of the invention and by reference to the appended drawings and claims.

BRIEF DESCRIPTION OF THE DRAWINGS

FIG. 7 is an illustration of an exemplary MPLS LSP Forwarding Table stored at a BM in accordance with one embodiment of the present invention.

FIG. 8 is an illustration of an exemplary MAC Address Forwarding table stored at a BM in accordance with one embodiment of the present invention.

DETAILED DESCRIPTION OF EMBODIMENTS OF THE INVENTION

Figure 1:
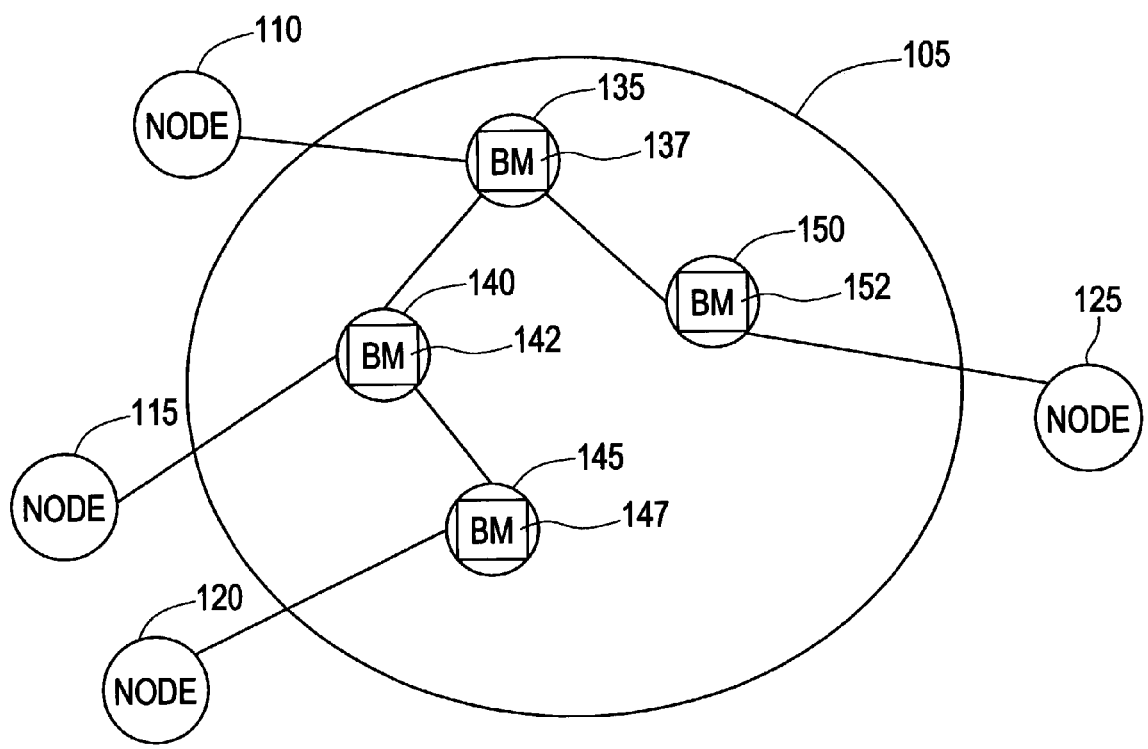
FIG. 1 is an illustration of a Layer-2 Virtual Private Network (VPN) in accordance with one embodiment of the present invention.

The present invention is carried out by techniques which provide Layer-2 VPN services by routing packets in a distributed network. The network forwards packets based on Layer-2 routing information, e.g., an Internet address, contained in the header of the packet. The network contains a number of MPLS-capable interconnected nodes that can support multiple Layer-2 VPNs. Each node contains at least one BM for supporting the Layer-2 VPNs. Each BM runs a protocol for exchanging Layer-2 VPN information between the multi-purpose nodes. In an exemplary embodiment, the BMs use the BGP-MP protocol for exchanging packets. However, those skilled in the art will appreciate that other protocols may be used for exchanging Layer-2 information without departing from the spirit or scope of the invention.

Each BM also administers a spanning tree program, which incorporates the IEEE 802.1d standard, to determine the optimal set of LSP connections required to provide complete connectivity between the multi-purpose nodes in the VPN. The spanning tree program first establishes MPLS LSPs between each pair of BMs to form a full-mesh network. The spanning tree module then determines a root BM based on administrative criteria associated with each BM. Each LSP is then allocated an initial amount of resources, i.e., bandwidth, for transmitting and receiving packets. Next, the spanning tree program determines the optimal number of active LSPs between the multi-purpose nodes to support the VPN. These LSPs are the "active" LSPs of the network. The remaining LSPs are the "inactive" LSPs. The spanning tree program detects the inactive LSPs and causes each BM connected to an inactive LSP to de-allocate the resources associated with the inactive LSP. Specifically, the BMs reduce the resources associated with the inactive links to a minimum, just enough to allow the BM to send and receive control messages. The remaining resources are placed in a general resource pool, which is made available to the other LSPs connected the BM.

The spanning tree program uses a BP to exchange critical information. One of the more important BPDU messages for creating the spanning tree is the Configuration BPDU. The Configuration BPDU contains four parameters that are important for creating the spanning tree: a Bridge Identifier; a Root BM Identifier; a Root Path Cost; and a Port Identifier. The Bridge Identifier identifies the particular BM in the VPN from where a BDPU message originates. The Root identifier identifies the root BM, as currently perceived by the BM that originates the BPDU messages. The Root Path Cost parameter measures the resource cost from the BM that originates the BDPU message to the BM that it perceived as a root, i.e., the transit delay between two BMs as encoded in the Bridge Identifier and Root Identifier above. Finally, the Port Identifier identifies a particular port that is used by a particular BM to connect to an LSP when two BMs are connected through multiple ports.

Once the BMs are connected in a full-mesh fashion, a BM forwards BPDU messages to the other BMs that are directly connected to it through an LSP. Each BM continuously updates a database from the BPDU messages received with updated information from each neighboring BM. This way, information is propagated through each BM through the entire network. Eventually, the BM with the highest priority is selected as the root BM. The remaining BMs are connected to the root BM by selecting the path with the lowest cost value.

Turning now to the figures, in which like numerals refer to like elements through the several figures, FIG. 1 is an exemplary high speed network 105 that consists of a number of multi-service nodes 135, 140, 145, 150, and 155. Each of the multi-service nodes, 135, 140, 145, 150, and 155 are interconnected by a series of MPLS LSP connections. Nodes 110, 115, 120, 125, and 130 that lie outside the high-speed metro network and provide customer access interfaces are known subscriber nodes.

Each multi-service node 135, 140, 145, 150, and 155 contains a processing unit, which controls the operation of the Bridging Modules (BM) 137, 142, 147, 152, and 155, respectively. The BMs 137, 142, 147, 152, and 155 have an associated Layer-2 Medium Access Control (MAC) Address and are connected together by bi-directional MPLS LSP connections to form the VPN. Each BM 137, 142, 147, 152, and 155 is responsible for administering the spanning tree algorithm and coordinating the flow of packets around the VPN 100. Each BM 137, 142, 147, 152, and 155 sends out a Layer-2 control message to every other BM within the VPN 100. The Layer-2 control message may contain information that includes the identity of the particular node that the BM resides in, the MAC Address of the node, the number of VPNs that the node supports. Additionally, for each VPN supported by the node housing the BM, the Layer-2 control message contains the following additional information: the VPN identifier; the MAC Address of the BM, the QoS associated with the VPN, the Interior MPLS Label that the BM uses to send packets to the node, and an identifier that indicates the exterior LSP. The indicator uniquely identifies the two endpoints of the MPLS LSP between the two nodes when the LSPs were established.

For each QoS supported by the VPN 100, at least two LSPs are established between each pair of multi-service nodes 135, 140, 145, 150, and 155: one LSP for data flow in one direction and another for data flow in the opposite direction. For example, if a service provider provides three QoS, such as Gold, Silver, and Bronze, then a total of three (3) bi-directional LSPs are created between the nodes. Each LSP is established automatically based on the subscriber's policy. For instance, when a customer subscribes to a Layer-2 service with a particular level of QoS, the packet associated with that particular node is placed on the LSP associated with that particular service.

A second MPLS label, known as the Interior MPLS label, is used to convey information about the VPN 100. The Interior MPLS label is inserted by the ingress node, i.e., the multi-service node connected to the subscriber node from which the packet is received, and the egress node, i.e., the multi-service node connected to the subscriber node to which the packet is being sent. The transit nodes, i.e., the multi-service nodes lying between the ingress and egress nodes, do not act upon the Interior MPLS label.

As an example, consider multi-purpose node 135 as being the ingress node. Assume multi-purpose node 135 receives a packet from subscriber node 110, which is intended to be sent to subscriber node 120. Upon receiving the packet, BM 137 determines that the packet is destined for BM 147 at node 145 using a Forwarding Table (described below) at BM 137. BM 137 also determines from the Forwarding Table both the Exterior Label of the MPLS LSP and the Interior Label of the LSP between BM 137 and BM 147. BM 137 then encapsulates the packet with the two labels and transmitted through the appropriate interface. The MPLS routing logic, based on the Exterior Label, routes the packet through node 140 and BM 142 to reach BM 147. Once the packet arrives at multi-purpose node 145, the Exterior Label is examined and the determination is made that the packet terminates at node, the MSLP LSP connection terminates. The multi-purpose node 145 then examines the Interior Label and by the value determines that the packet belongs to VPN 100 and is routed to BM 145. BM 145 in turn, forwards the packet to the subscriber node 120. Thus, the Exterior Label is used to route the packet through VPN 100 to the appropriate egress node 140. The interior Label is then used to determine the appropriate BM at the egress node in which to route the packet.

The nodes 135, 140, 145, and 150 have been described as allocating separate BMs to support each VPN. In this configuration each BM would has its own Layer-2 MAC address. An alternate embodiment is to have a single BM at each node supporting all of the Layer-2 VPNs at that particular node. Those skilled in the art will appreciate that the two embodiments are logically identical. However, there are two differences between the two embodiments, which are merely cosmetic. The first difference is in the case of the single BM is that only a single MAC address for the root BM is needed. The second difference is that for the case of a single BM, all control messages must include a VPN identifier, such as the VPN identifier described in RFC 2685 by the Internet Engineering Task Force (IETF), to indicate the appropriate VPN.

The traditional method in providing transparent LAN service is through bridging. In bridging, the BMs are connected by a series of high speed connections to form a LAN. To ensure reliability, each LAN segment may be connected to multiple BMs. In a similar fashion, the BMs may be connected through multiple LAN segment. In order to avoid loops, only certain connections between each of the BMs are active at any given time.

Figure 2A:
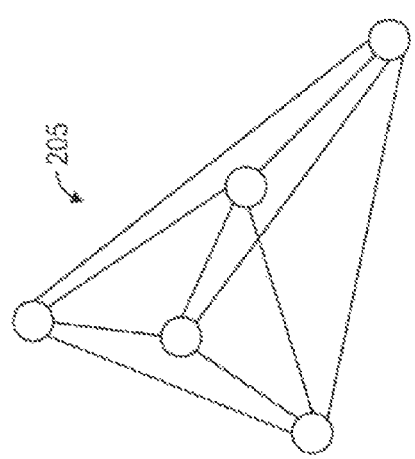
FIGS. 2A-C illustrate of a spanning tree in accordance with one embodiment of the present invention.
Figure 2C:
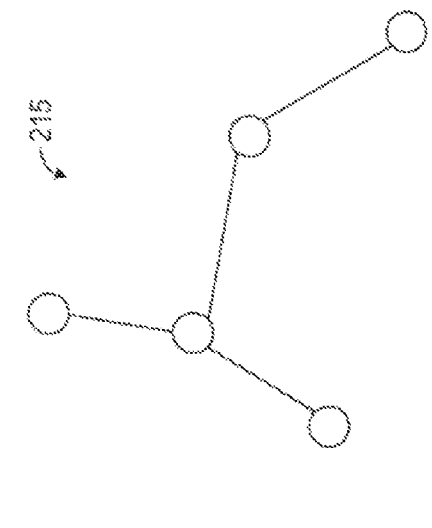
Figure 2B:
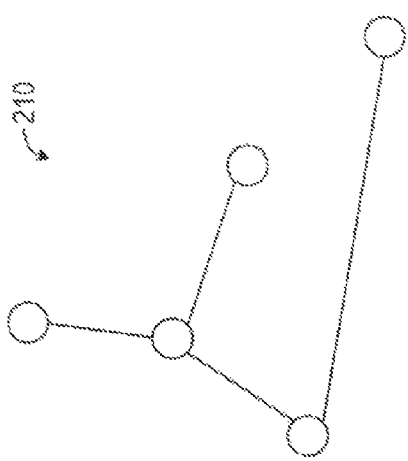

The connections form a tree topology that connects all the BMs in a minimal fashion. This topology, which is commonly referred as the "spanning tree," is illustrated in FIGS. 2A, 2B, and 2C. FIG. 2A illustrates a spanning tree 205 that is constructed using the physical connectivity between each BM. Usually, a BM communicates with its peer BMs through a spanning tree program. Through the spanning tree program, the spanning tree may be formed automatically. When there is a failure along one of the connections, the modules are able to detect the failure and reroute the connections. Another spanning tree is then formed to ensure failure-free connections between the BMs and the proper operation of the LAN. The standard for bridging, including a spanning tree algorithm, is specified in the IEEE 802.1 d standard.

Once the root BM is selected, the other BMs attempt to connect to the root BM, either directly or through other BMs. The criterion for connection is to use the least accumulated path cost. The cost of the path to the root through a BM is encoded in the Root Path Cost parameter. The value is obtained by adding the cost of the individual segments of the path. In the IEEE 802.1d standard, the cost of a segment is inversely proportional to its bandwidth, i.e. the higher the bandwidth, the lower the cost.

There are several ways to encode this. The exact method to use depends on the service level agreement between the service provider and the subscriber. The method used is determined by customer's requirements. For some applications, all of the LSPs between BM pairs are allotted the same amount of bandwidth, i.e., x Mbps. The network cost is calculated as the inverse of the bandwidth, as specified in the IEEE 802.1(d) standard. Under this standard, the resulting spanning tree would contain a single layer. Although this method results in a straightforward spanning tree that requires less processing power in the non-root BM, this method requires a greater usage of bandwidth.

If on the other hand, the amount of bandwidth available for the network is limited, then a single layer spanning tree will not be the most efficient use of resources. It may be more advantageous to assign different bandwidths to each LSP. The service provider may want to do this so that he or she can charge the subscriber based on the access bandwidth of a location. The exemplary embodiment provides an enhancement to the IEEE 802.1d standard that allows the LSPs between BM pairs to be assigned different bandwidths. For a given LSP, since the access bandwidth of the two-end BMs may be different, the larger of the two would be used to initially establish the LSP. Once the spanning tree is formed, the bandwidth of the LSP can be reset to the optimal value if needed. Alternatively, the BM that has been allotted the least amount of bandwidth may be used to initially establish the LSPs. There are many variations on this, but all of them follow the same principle. For example, in another alternative embodiment, each LSP that directly connects a BM to the root BM would be selected as an "active" LSP.

In still another alternative embodiment, the VPN may be allocated a fixed amount of bandwidth of x Mbps. This is to say that each LSP segment within the network would have an allocated bandwidth of x Mbps. In setting up MPLS LSP, the hop-count of the LSP between the BM and the root BM is known by the node. The LSP between two nodes is set up so that the LSP follows the path. The network cost of an LSP would be M, where M is the hop count of the LSP. This strategy will form a tree with the minimum amount of physical hops, thereby requiring the least amount of bandwidth.

There are several important objectives in the spanning tree protocol: the root BM and the designated BM of a LAN or connection. This is the BM connecting a LAN (or a connection) that is closest to the root BM. The designated port, which is the active port of a designated bridge. In determining the spanning tree, a rule must in place to break tie. Typically, the MAC address between bridges and port identifier between ports.

The IEEE 802.1d standard addresses how BMs should behave in support of a single LAN. However, for service providers, their network would support multiple LANs from different customers. For example, a customer's network may only connect to a limited number of the nodes of the network. In this case, it is more efficient, from a bandwidth point of view to have an instance of spanning tree for each LAN (or VLAN), resulting in multiple instances of spanning trees in the network.

In one embodiment of the present invention, each VPN is assigned to a dedicated BM. After learning the presence of each other, the multi-service nodes exchange Layer-2 VPN information, by sending a packet containing a number of identifying indicia. For example, the packet typically contains the identity of the multi-service node, the MAC address of the multi-service node, and the number of L2-VPNs that the particular multi-service node supports. Additionally, each packet may also contain information about each L2-VPN. Typically, for each L2-VPN, the packet will typically contain an identification tag associated with the VPN, the MAC address of the BM, the grade of service requested for the particular VPN, the bandwidth associated with the particular VPN, an interior MPLS label used to send packets to the node, and an identifier that specifies the exterior LSP. It should be noted that the label for the exterior LSP can change as the MPLS packet is routed through the network. The MPLS label uniquely identifies an MPLS LSP between the two end-points of the LSP. This MPLS LSP parameter is agreed upon between the two nodes when the LSP is set up. The common signaling protocol for MPLS is RSVP-TE. If the RSV-TE protocol is used for signaling, then the session object can be used to identify the LSP to the ingress and egress nodes.

After all the nodes are MPLS enabled, all of the BMs may be directly connected through LSPs. FIG. 2A illustrates the topology of network 205 in which each of the bridging modules are physically connected to one another through MPLS LSPs. However, the fully connected solution does not scale well. In general, a network with N nodes would require N*(N−1)/2 bi-directional connections. For example, the network 205 illustrated in FIG. 2A, contains 5 nodes. Therefore, the network 205 requires 10 bi-directional connections. Similarly, a network with 4 nodes requires 6 bi-directional connections, while a network with 8 nodes would require 28 bi-direction connections. The number of physical bidirectional connections grows exponentially with respect to the number of nodes. Because the network has to assign resources to support each connection, network cost would become prohibitive, as the network costs would outgrow revenue.

FIG. 2B illustrates an exemplary spanning tree 210 illustrating a possible configuration for connecting each node within the network. This reduces the number of bi-directional connections to (N−1) for a VPN containing N multi-purpose nodes. Thus, the spanning tree 210, which is shown as having five (5) nodes would require only four (4) connections to insure full network connectivity. The difference becomes more pronounced as the number of nodes in the network increases. For example, if the network contained eight (8) nodes, then the required number of bi-directional connections would be seven (7), which is far less than the 28 bi-directional connections required for full-mesh connectivity. Those skilled in the art will appreciate that many configurations of the spanning tree may be possible for any given network while providing the same level of connectivity. FIG. 2C illustrates spanning tree 215 that provides an alternative configuration to the spanning tree 210 while providing the same level of connectivity.

Figure 3:
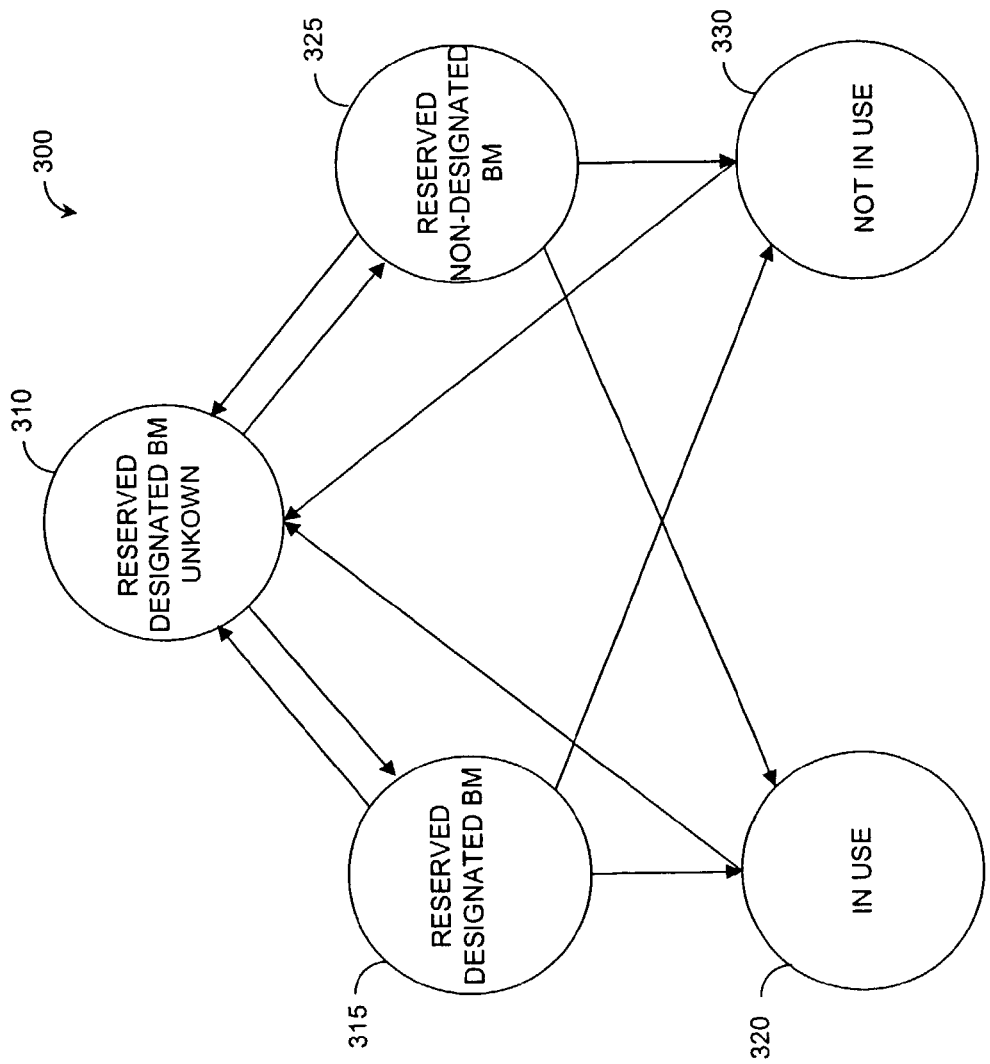
FIG. 3 is an illustration of a state transition diagram in accordance with one embodiment of the present invention.

FIG. 3 is a state transition diagram 300 illustrating an exemplary method for managing the resources of the LSP connected to a BM. Under the spanning tree protocol, a BM joins the spanning tree by locating a BM that is higher in the spanning tree hierarchy than itself according the Root Path Cost value. For each LSP, the spanning tree program determines which of the BMs is the designated BM for the LSP between the two BMs. The designated BM is the one that is higher in the spanning tree program. Once a non-designated BM decides an LSP is part of the spanning tree, the BM generates BP control messages, which sets the status flag of the LSP to "in use." Simultaneously, the BM sends BP control messages to every other peer BM in the VPN that are higher in the hierarchy, indicating that the LSP between them is inactive.

Turning to the state diagram 300, the LSP between the local BM and the new BM is initially set to a Reserved Designated BM Unknown state 310. When a new BM connects to a local BM, the LSP between the local BM and the new BM enters the "Reserved-Designated" state 315. If the local BM is the designate BM, it waits for a BP message from the non-designated peer BM indicating that the LSP is "In Use" then the local BM enters the "In Use" state 320 from the "Reserved-Designated" state 315. However, if the designated BM receives a BP control message in which the non-designated peer BM has set the resource flag to "Not-In-Use," then the LSP between the designated BM and the non-designated BM enters the "Not-In-Use" state 330.

At the non-designated BM, the LSP enters the "In Use" state 320 if the determination is made by the spanning tree program that the LSP between it and the peer designated BM should be active. If the spanning tree program determines that the LSP should be active, then every BP message generated by the non-designated BM will have the resource flag set to "in-use." Upon receipt of the control message with the "in-use" indication, the designated peer BM responds by sending BP messages to each of the peer non-designated BMs with the resource flag set to "in-use."

However, if the spanning tree program determines that the LSP between the two BMs should be inactive, then the non-designated BM enters the "Not-In-Use" state 330. Every BP message generated by the non-designated state will not have the resource-status flag set to "not-in-use." Upon receipt of the control message with the "not-in-use" indication, the designated BM responds by forwarding BP messages to every non-designated peer BM with the resource flag set to "not-in-use." Although one embodiment of the present invention uses resource flags to indicate the state of the BMs, other methods, such as special messages, may be used to set the state of the BMs.

If the VPN should undergo a change in the status, such as the root BM changes or the designation of a BM for an active LSP changes from designated to non-designated, or vice versa, or even if one of the active LSPs goes down, or any event that alters the status of the VPN, the BMs will enter the Reserved Designated BM Unknown state 310 from each of the other states 315, 320, 325, and 330. Once this happens, the spanning tree program begins anew to establish a new spanning tree for the newly formed VPN.

Figure 4:
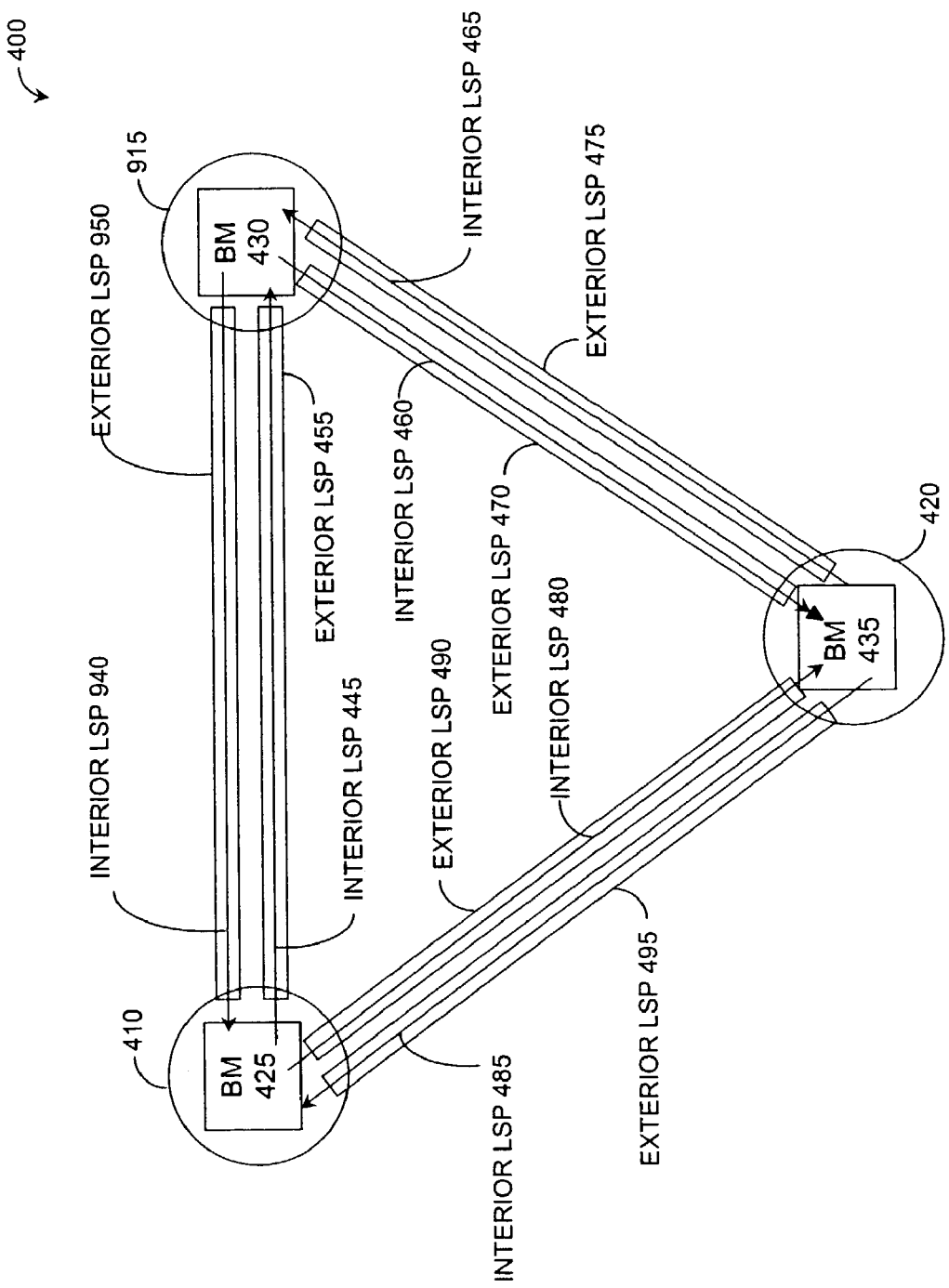
FIG. 4 is an illustration of how BMs are connected through interior LSPs encapsulated by an exterior LSP.

The above state diagram 300 may be illustrated by an example. FIG. 4 illustrates a VPN network 400, which consists of three nodes 410, 415, and 420. Within each node, there is a corresponding BM, 425, 430, and 435, respectively. In the example, BM 425 in node 410 has the highest priority and BM 335 in node 420 has the lowest priority. After exchanges of BP messages, the nodes 410, 415, and 420 would each determine that BM 425 in node 410 is the "root BM" and therefore, has the highest priority. It is also determined that BM 430 communicates with BM 425 using the interior LSPs 440 and 445. Similarly, BM 435 will use the interior LSPs 480 and 485 to communicate with the root BM 425.

After the connections are established the root BM 425 sets a resource-status flag to "In Use" when sending BP messages to BM 430. Upon receipt of the BP message, BM 430 would change its resource associated with the LSP 440 and 445 from "Reserved" to "In Use." Upon receipt of messages from the BM 430 with the flag set to "in use," BM 425 would response by setting the flag to "In Use" when sending BP messages and also change the resources associated with LSP from "Reserved" state to the "In Use." The same procedure applies to the LSPs between BM 425 and BM 435.

The interior LSPs 460 and 465 between BM 430 and BM 435 are not part of the spanning tree. Furthermore, BM 430 is the "designated" BM. Therefore it is up to BM 435 to set the resource-status flag associated with the interior LSPs 460 and 465 to the "not-in-use" state when sending BP messages to BM 430. Once the status-flag is set to the "not-in-use" state," BM 435 is then able to de-allocate the resources assigned to the interior LSPs 460 and 465 and make them available for the interior LSPs 480 and 485 running between BM 435 and the root BM 425. Upon receipt of the BP message from BM 435, BM 430 sets its resource-status flag associated with the interior LSPs 460 and 465 to "Not-In-Use" and de-allocates all resources assigned to LSPs 460 and 465.

Figure 5:
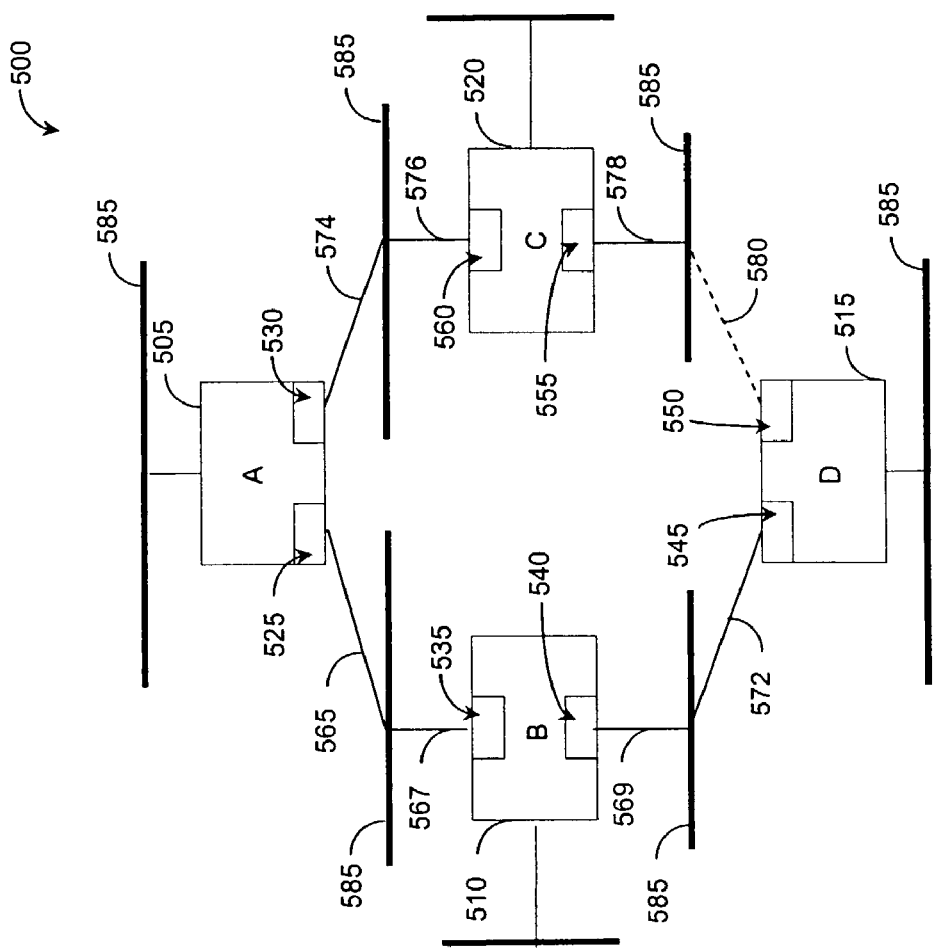
FIG. 5 is a prior art illustration of a VPN in which BMs are connected to one another through a series of Ethernet connections.

The spanning tree algorithm, as specified in the IEEE 802.1d standard does not de-allocate all of the resources allocated to inactive links. This is due to the fact that the network is dedicated entirely to a single VPN. Therefore, reallocating resources of inactive links makes no sense as there is only one network. As stated above, the purpose of the spanning tree algorithm is to avoid loops. Furthermore, the IEEE 802.1d standard is designed to be used for networks where an Ethernet is used to connect the nodes and not when the nodes are directly connected, as with MPLS LSPs. This point is illustrated in by an example in FIG. 5. FIG. 5 is an illustration of a prior art network 500. The network 500 is shown with four multi-purpose nodes: BM A 1005, BM B 1010, BM C 515, and BM D 520. BM A 505, BM B 510, BM C 515, and BM D 520 contain a pair of ports 525 and 530, 535 and 540, 544 and 550, and 555 and 550, respectively. The ports 520 and 525, 530 and 535, 540 and 545, and 550 and 555 are each connected by Ethernet 585.

In the illustration, port 550 of BM 515 which is connected to Ethernet 585 is an "inactive" connection, which is represented by a dashed line. That is, no packets are passed through port 550, as the port is set to inactive to avoid loops. Because port 550 is inactive, the resources at port 1050 may be re-allocated. However, the port 555 of BM D 520, which is connected to Ethernet 585 remains active because there may be other active workstations connected to Ethernet 585, which require a connection to BM 520.

Figure 6:
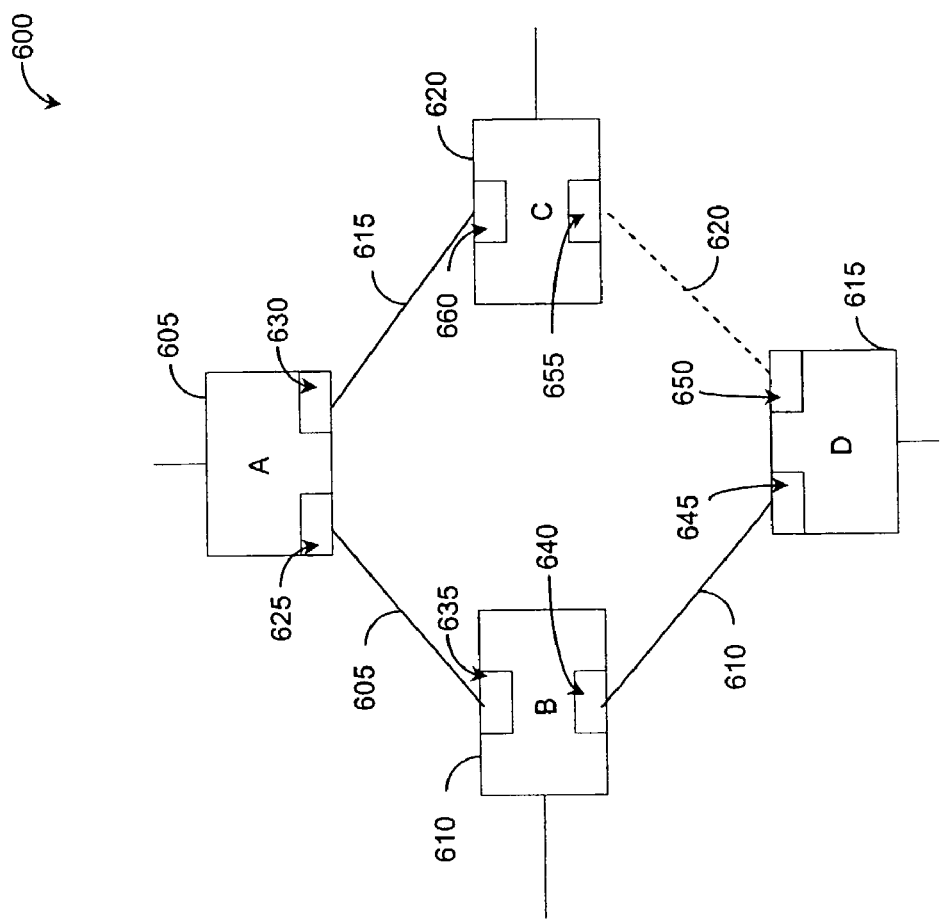
FIG. 6 is an illustration of a VPN in accordance with one embodiment of the present invention showing both active and inactive LSPs between BMs.

FIG. 6 is an illustration of VPN 600 in accordance with the invention. VPN 600 contains four BMs; BM A 605, BM B 610, BM C 615, and BM D 620. However, unlike the connections in the prior art VPN 500, in which the LSPs are connected to Ethernet 585, BM A 605, BM B 610, BM C 615, and BM D 620 are directly connected to one another through MPLS LSPs. The VPN 600 only requires that BM A 605, BM B 610, BM C 615, and BM D 620 form a "network." That is, packets must be able to travel between each and every BM, either directly, or through an intermediary BM. The actual configuration of the network 600 is determined by generating a spanning tree for the network under the IEEE 802.1d specification. The spanning tree automatically determines the "optimal" configuration by identifying the active LSPs needed to form the VPN 600.

In the illustration, BM A 605 is designated as the "root" node, and is considered "upstream" from the remaining BMs. That is, the flow of all packets through the network is controlled by BM A 605. BM B 610, BM C 615, and BM D 620 are the "downstream" modules. There are three active bi-directional LSP links: LSP 605 between BM A 605 and BM B 615, the LSP 610 between BM B 615 and BM D 620, and LSP 615 between BM A 605 and BM C 615. The LSP 620 between BM C 615 and BM D 620 is "inactive," that is no packets can pass between BM C 615 and BM D 620. The inactive link 680 is represented by the dashed line in FIG. 11. The spanning tree algorithm detects the inactive link 680 and generates the proper command messages, which are sent to BM A 605 and BM 620. The command messages contain a value in the administrative field (discussed below), which "de-allocates" the resources associated with BMs. Specifically, the administrative field reduces the resources assigned to the interface 640 in BM C 625 and to the interface 660 in BM D 620 to a bare minimum to support the BP. The de-allocated resources are then returned to the resource pool for use by other subscribers and applications, thereby conserving network resources.

As an example, if more and more Layer-2 VPNs are added to the network, there may insufficient resources available at an exterior LSP to support a newly initiated VPN. In this case, the multi-purpose node can perform one or more options to address the insufficient resources. First, the multi-purpose node may request more bandwidth for the LSP. The additional bandwidth may be selected from the resource pool if one or more LSPs are "inactive," in which their resources are available to the other LSPs. If however, there are no additional resources to be directed toward the LSP, a new LSP of appropriate QoS between the two multi-purpose nodes may be established. This typically occurs when there insufficient bandwidth along the original LSP, and there is insufficient resources in the resource pool.

A BM may be disconnected from the spanning tree due to unforeseen failures in the VPN. The disconnected BM can "recover" and resume a connection to the VPN using one of several methods. One method allows the disconnected BM to recover if there are other LSPs connecting the BM and its peer, with the same QoS and sufficient bandwidth, the disconnected BM can use that LSP to connect back to the VPN. The disconnected BM first informs its peer by sending a BGP message indicating that the LSP between them has changed. The disconnected BM then sends a BP messages over the LSP. The policy of the service provider may be such that the LSP does not need to be of the same QoS. Also, the bandwidth may not be to be the same for the disconnected BM to rejoin the VPN under an error condition. However, if there is no other LSP satisfying the service requirements between the disconnected BM and its peer BM, then the disconnected BM can proceed to enter the VPN as a new BM.

FIG. 7 illustrates an exemplary Forwarding Table 700 in connection with the present invention. The Forwarding Table 700 includes a number of entries which include several data fields that contain values used to direct Packets to the proper nodes. More specifically, each entry contains a Peer Node Identifier field 705, a Peer BM Identifier field 710, an Exterior MPLS Label when Receiving field 715, an Exterior MPLS Label when Transmitting field 720, an Interior MPLS Label when Receiving field 725, an Interior MPLS Label when Transmitting field 730, and a QoS field 735. The Peer Node Identifier field 705 holds a value, which identifies every peer node, i.e., multi-service node, within the network 100. The Peer BM Identifier field 710 contains a value, which identifies the BM associated with the particular node. The Exterior MPLS Label Receiving field 715 contains a value, which identifies the interface that is used by the node for receiving packets over MPLS connections. The Interior MPLS Label Transmitting field 720 similarly contains a value that identifies the interface used by the BM to forward packet to peer node over MPLS connections.

The Interior MPLS Label Receiving field 725 contains the value of the interface used by the BM within the node for receiving the packet from a peer BM. The Interior MPLS Label when transmitting field 730 contains the value of the interface used by the BM to transmit the packet to peer BM within the network. Lastly, the QoS field 735 contains a value that identifies the level of the QoS associated with the connection.

In addition to the Forwarding Table 700, the BM also maintains a MAC Address Forwarding table that is used to identify the forwarding interface of the packet based on MAC addresses. FIG. 8 is an illustration of an exemplary MAC Address Forwarding Table 800. Each entry of the MAC Address Forwarding Table 800 contains a Destination MAC Address field 805, a Peer Node Identifier field 810, a Peer BM Identifier field 815, a Local Exterior MPLS Label field 820, an Interior MPLS Label field 825, and a local Interface ID field 830. It should be noted that the forwarding interface at the BM may be either a local interface, which connects to a subscriber node 110 (FIG. 1) or an MPLS interface, which connects the BM to another peer BM. If the MAC Address field 805 points to an MPLS interface, then only the Local Exterior MPLS Label field 820 and the Interior MPLS Label field 825 will contain values. The Local Interface field 830 will be empty. Similarly, if the MAC Address field 805 contains a value that points to a Local Interface, then only the Local Interface field 830 will contain a value and both of the MPLS fields will be empty. Thus, of the last three fields, either both of the MPLS labels 820 and 825 will contain values or the Local Interface field 830 will contain a value. It should be noted that the MAC Address Forwarding Table 800 typically also contains several fields associated with management of the table, such as aging time, and the like, which are not shown.

Figure 9:
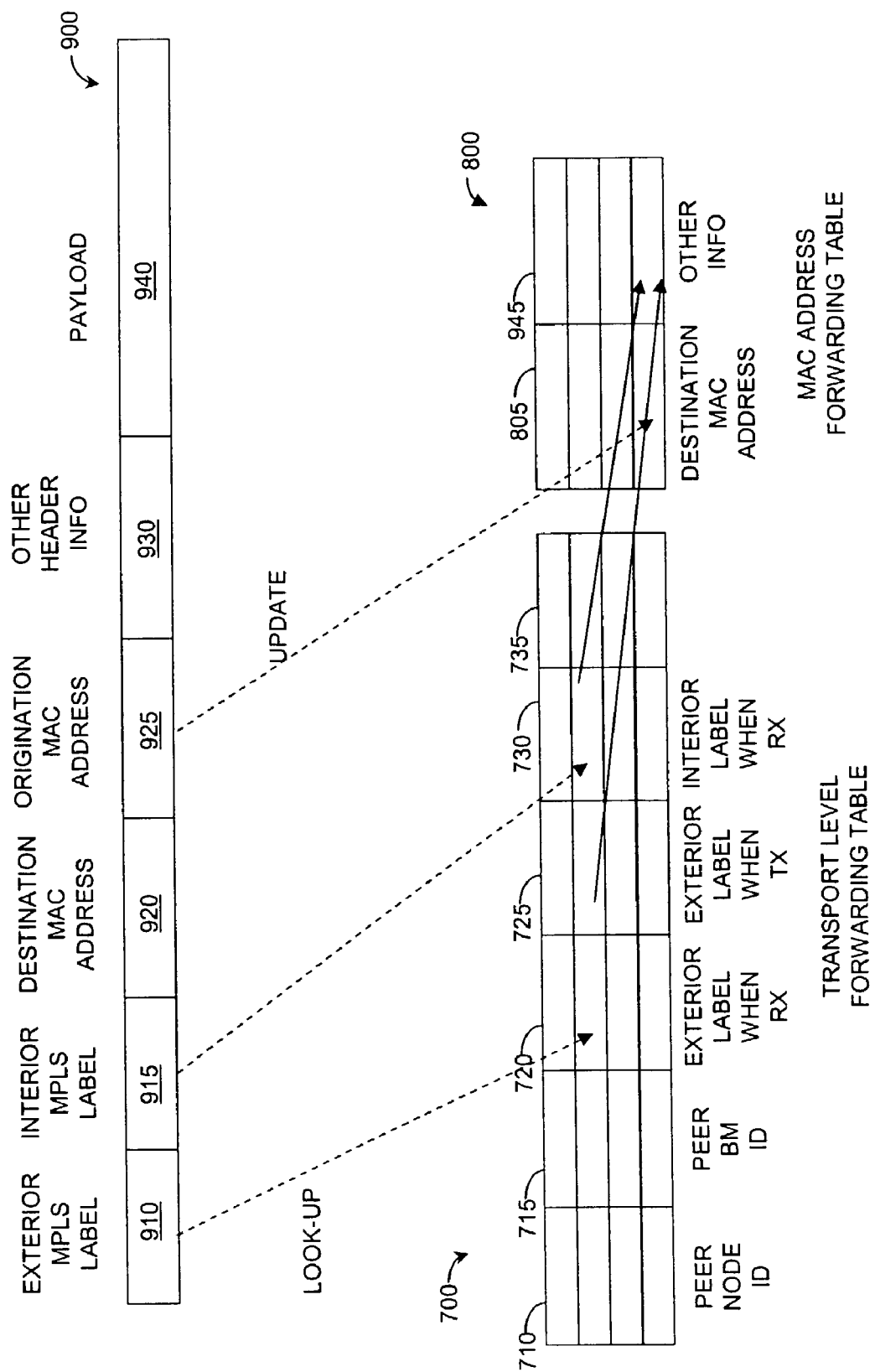
FIG. 9 is an illustration of an exemplary embodiment of a learning process performed at a BM upon receiving a packet from a peer BM in accordance with one embodiment of the present invention.

FIG. 9 illustrates an exemplary illustration of packet learning process in accordance with one embodiment of the present invention. A packet 900 to a BM contains an Exterior MPLS Label field 910, an Interior MPLS Label field 910, a Destination MAC Address field 915, an Origination MAC Address field 920, an Other Header Information field 925, and a Payload field 930. Upon receiving the packet 900, the BM examines the values in the Exterior MPLS Label field 510 and Interior MPLS Label field 910. The BM uses these values to look up the values in the Peer Node ID field 710 and the Peer BM ID field 715 in the Forwarding Table 700. The BM also retrieves the values of the MPLS Labels stored in the Forwarding Table 700, which will be used to transmit the packet 900 to the appropriate peer node. The BM then updates or stores these values in corresponding MPLS Label fields in the MAC Address Forwarding Table 800. Next, the BM examines the value in the Origination MAC Address field 925 of the packet 900. The BM uses the value from the Origination MAC Address field 925 to update the value in the Destination MAC Address field 805 of the MAC Address Forwarding Table 800 associated with the BM.

Figure 10:
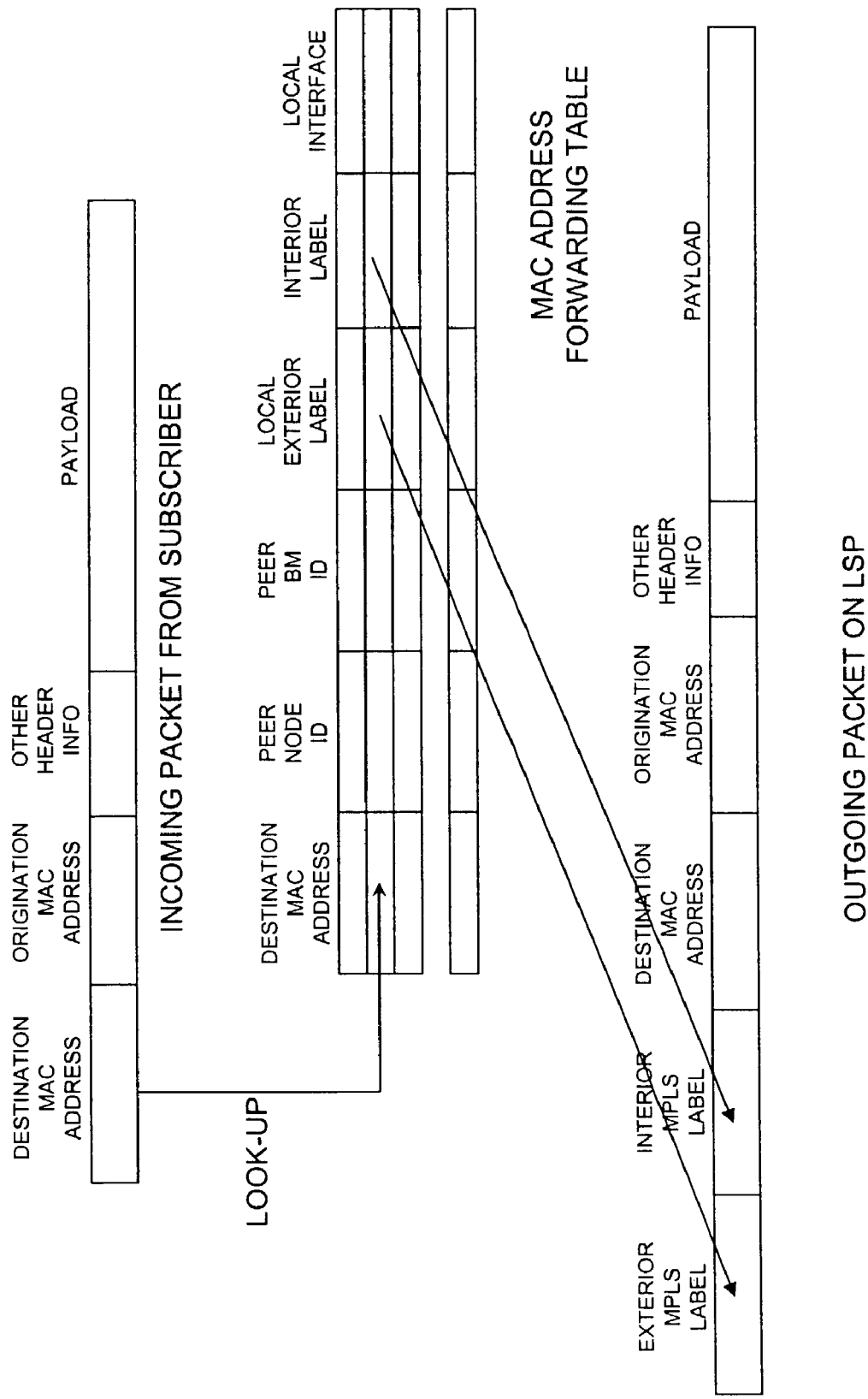
FIG. 10 is an illustration of an exemplary forwarding process for forwarding a packet to a Bridging Module over an MPLS interface in accordance with one embodiment of the present invention.

After the MAC Address Forwarding Table 800 has been updated, the BM uses the updated values to forward the packet to the appropriate peer node. FIG. 10 illustrates an exemplary process 1000 for forwarding the packet 900 to a peer node. The BM examines the value in the Destination MAC Address field 920 of the packet 900 and determines whether the value in the Destination MAC Address field 920 is stored in the MAC Address Forwarding Table 800. If the BM locates the value in the one of the Destination MAC Address fields of the MAC Address Forwarding Table 800, the BM then determines whether the value points to one of the BM's forwarding interfaces. If BM determines that the value does not point to one of the forwarding interfaces, then the BM makes the further determination whether the forwarding interface is an MPLS interface connected to another BM or a local interface connected to a subscriber node. If the forwarding interface is another MPLS interface, then the values from the Local Exterior MPLS Label field 820 and the Interior MPLS Label field 815 are used to update the Exterior MPLS Label field 910 and the Interior MPLS Label field 915 of the packet 900, respectively. If, however, the BM determines that the forwarding interface is a local interface, then the BM removes the values from the Exterior MPLS Label field 910 and the Interior MPLS Label field 915 before forwarding the packet to the subscriber node.

Figure 11A:
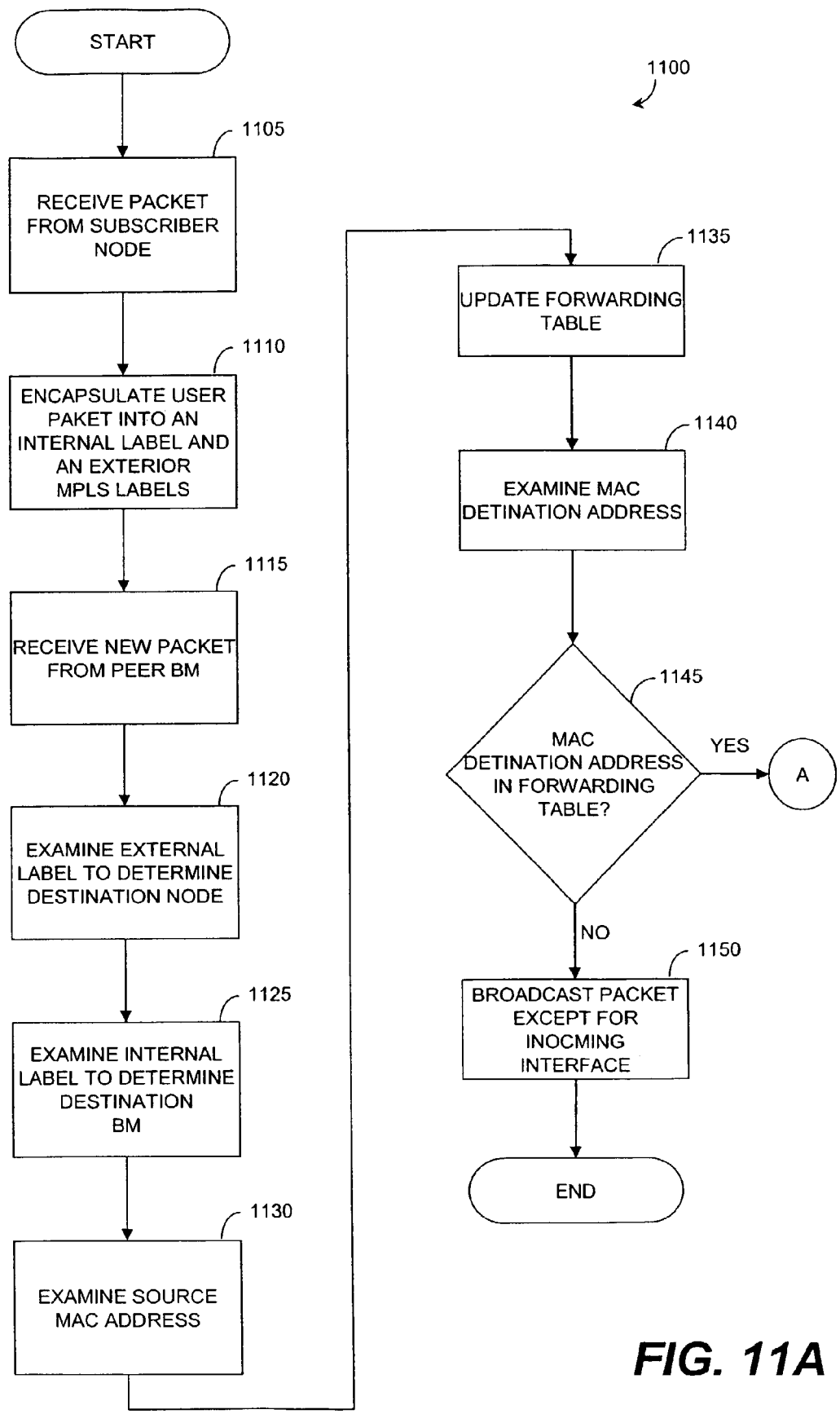
FIGS. 11A and 11B, collectively known as FIG. 11, show logic flow diagrams illustrating an exemplary routine for determining active and inactive LSPs at each BM and de-allocating resources associated with inactive LSPs in accordance with one embodiment of the present invention.
Figure 11B:
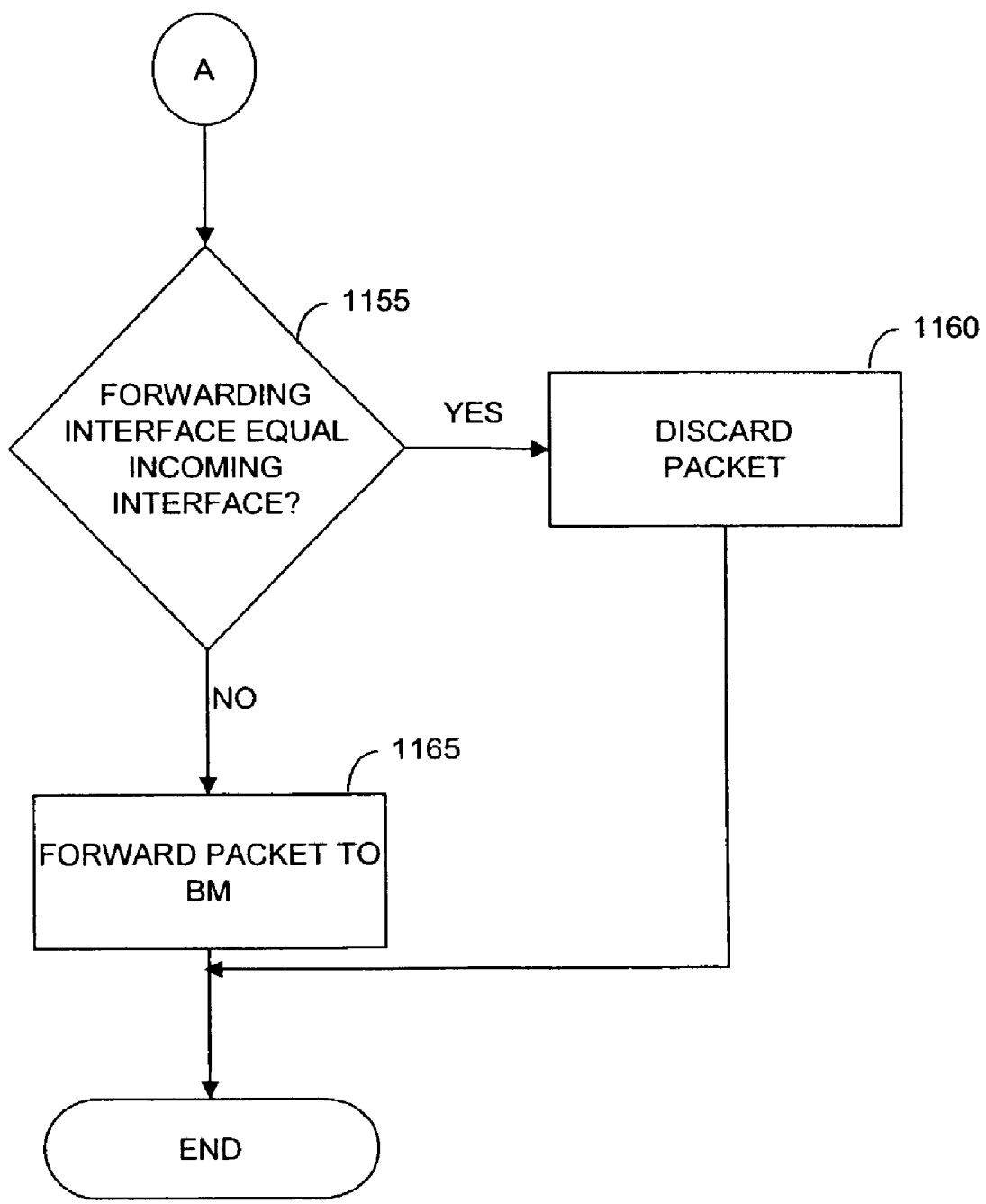

FIGS. 11A and 11B, collectively known as FIG. 11, are logic flow diagrams illustrating the packet learning and forwarding process 1100 of the present invention. When a packet 900 (FIG. 9) arrives at a BM, the Origination MAC Address 930 is used to update the Forwarding Table 700, while the Destination Address is used to determine the forwarding interface. The learning and forwarding process begins at 1110 in which the BM receives at least one packet 900 from a subscriber BM 110. At 1115 the BM examines the packet 900 and retrieves the value stored in the "Exterior MPLS Label" field 915. The BM uses the value of the MPLS label value and matches the value with the appropriate entry in the "Exterior Label When Receiving" field 715 from the Forwarding Table 700. The BM then retrieves the corresponding value from the "Peer Node ID" field 705 from the Forwarding Table 700.

Next at 1120, the BM retrieves the value stored in "Internal MPLS Label" field 915 from the packet 900. The BM then uses value to look up the value stored in Peer BM Identifier field 710 in the Forwarding Table 700. Additionally, the BM uses the same entry in the Forwarding Table 700 to determine the appropriate Exterior Label Transmitting value 720 that is used to transmit the packet to the appropriate peer BM.

At 1125 the BM retrieves the value in the Origination MAC address field 930 of the packet 900. At 1130, the values from the "Exterior MPLS Label" field 910 and the "Interior MPLS Label" field 915 of the packet 900 are used to update the "Exterior Label When Receiving" field 720 and the "Interior Label When Receiving" field 730 of the Forwarding Table 700, respectively.

At 1135, the BM retrieves the value from the "Destination MAC Address" field 930 from the packet. The BM examines the value and compares it to each entry in the "Destination MAC Address" field 805 in the MAC Address Forwarding Table 800. If the value contained in the Destination MAC Address field 930 is listed in the MAC Address Forwarding Table 800, then the "YES" branch is followed to 1145, where the determination is made by the BM whether interface that the packet arrived through is the same interface which the packet is to be forwarded over. If the two interfaces are the same, then the "YES" branch is followed to 1150, where the packet is discarded. If however, the determination is made that the interface that the packet 900 arrived through is not the same interface that the packet 900 is to be sent out on, then the "NO" branch is followed to 1155, in which the packet is forwarded to the appropriate peer BM. However, the packet 900 may be forwarded through another MPLS interface or a local interface. If the forwarding interface is another MPLS interface, then the values in the "Exterior MPLS Label" field 510 and in the "Interior MPLS Label" field 915 of the packet 900 are replaced with the values indicated in the Forwarding Table 700. If on the other hand, the forwarding interface is a local interface, the "Exterior MPLS Label" field 910 and the "Interior MPLS Label" field 915 are striped from the packet 900 before it is forwarded to a subscriber node.

Returning to 1140, if the determination is made that if the value stored in the Destination MAC Address field 930 in the packet 5900 does not match any entry in the MAC Address Forwarding Table 800, then the "NO" branch is followed to 1160, in which the BM broadcasts the packet 900 over every interface connected to the BM, except the interface in which the packet 900 arrived on. This insures that the packet 900 will reach its intended destination.

Although the packet learning process 1100 has been described for a packet over an MPLS interface, those skilled in the art will appreciate that the packet learning process may be used for receiving a packet 900 over a local interface, with only minor adjustments. Specifically, when a packet 900 arrives over a local interface, the "Exterior MPLS Label" field and the "Interior MPLS Label field" are not examined due to the fact that the packet 500 does not have any MPLS labels. Instead of identifying the MPLS Labels, the value of the "Local Interface ID" field is identified. Lastly, the value in the "Local Interface" field is updated instead of the "External MPLS Label" field 910 and the "Internal MPLS Label" field 915.

Figure 12:
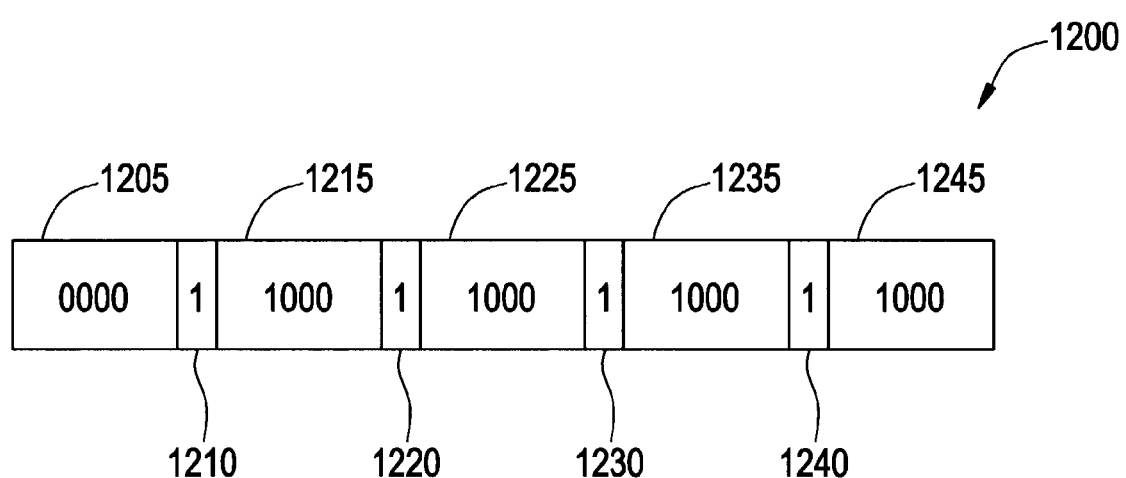
FIG. 12 is an illustration of an exemplary graphic key lock used in an LSP control message for managing the resources associated with LSPs in accordance with one embodiment of the present invention.

As stated before, direct application of the BP to the VPN tends to unbalance the network and create congestion points, as the BP keep assigning the same small number of nodes to be the root. In the control message of the BP, a BM is identified by a unique identifier, known as an administrative field 1200 is shown in FIG. 12. The administrative field 1200, which contains two fields: (1) an administrative priority field which allows the network to specify the priority of the BM in becoming the root BM or the designated bridge of a LAN, and (2) the MAC address of the BM which is used to break ties when the priority field in two or more BM contains the same value. In the IEEE 802.1d standard, the size and structure of the administrative priority field is dependent upon the implementation of the network. To provide enhanced management function of the network, the administrative field 1200 may be varied in both the number of fields it contains and size. For example, the network administrator may determine the number of fields in the administration field and also the number of bits in each field. It should be noted that the administrative field 1200 is an optional field. That is, the network administrator may permanently set a particular BM as the root BM for all conditions and therefore, any values in the administrative field would be overridden. However, the exemplary embodiment incorporates the functions of the administrative field 1200, as it allows for the most efficient use of resource management.

In an exemplary embodiment of the present invention, the administrative field 1200 is structured as follows, with descending order of priority, for the parameters: (1) Administrative Preference Parameter 1 1205, (2) Lock Key 1 1210, (3) Administrative Preference Parameter 2 1215, (3) Lock Key 2 1220, (4) Geographical Preference Parameter 1225, (5) Lock Key 3 1230, (6) Bandwidth Availability Indicator Parameter 1235, (7) Lock Key 4 1240, and (8) Load Balancing Parameter 1245. In the BP protocol, the administrative priority field is typically 2 octets long.

Therefore, in order to accommodate all the above fields and with adequate priority levels, the length of this field is variable and may be extended. The length of each field depends on implementation. In the following discussions, each field is 4 bits long, except the lock key fields, which are 1 bit. The default value for the fields is (1000). Parameters with lower values have a higher priority than parameters with a higher value. Therefore, a field of that contains the value (0000) has the highest priority.

The Administrative Preference 1 (AP1) field 1205 allows a subscriber to manually designate a multi-service node (or nodes) to be the root BM of a particular VPN. Similarly, the AP1 field 1205 may be used to designate those BM that are not to be selected as the root BM. The value of the AP1 parameter is set by the subscriber when he or she is initially configuring the VPN. For instance, in a network with a multi-purpose node that that has a BM that is known to handle the greatest number of packets, it would be advantageous to set this BM as the root BM. Therefore, the network administrator may instruct the BM to insert the desired value into the AP1 field 1205. Alternatively, if a node (or BM) is known not to handle a large amount of packets, then it may be advantageous to insure that this particular BM is not selected as the root BM. This is done by setting value of this field to be all 1's, which represents the lowest priority.

The Lock Key 1 field 1210 contains a parameter that is used to "lock" value in the APF1 field 1205. That is, the APF1 field 1205 cannot be changed is the value of the parameter in the Lock Key 1 field 1210 is set to a first value. For example, once a BM has been selected as the root, it may be disadvantageous to have a new BM with the same administrative priority and a lower MAC Address replaces the root BM. This may disrupt the operation of the network, although only briefly. Therefore, setting the parameter of the Lock Key 1 field 1210 to a first value, or "high priority" value, after a BM is selected to the root BM, insures that the root BM will not be interdentally replaced by a new BM entering the VPN.

Several techniques may be used to set the parameter in the Lock Key fields. Although the following discussion is directed to setting the parameter in the Lock Key 1 field 1210, the same principle applies for setting the remaining Lock Keys. In one embodiment of the invention, the BM examines the priority of the next field after the Lock Key 1 field 1210, which is the APF2 field 1215. If the value of the parameter in the next field has a higher priority than the predetermined default value of (1000), then the value of the parameter in the Lock Key 1 field 1210 is set to (0), which is the highest priority. The rationale is as follows. If the first bit of the next is field is 0, this indicates that this field has been set to a higher priority than the default. The parameter in the Lock Key 1 field 1210 is set to (1) protect the BM from being replaces as the root BM by a new BM entering the VPN because the root BM has a higher MAC address.

Next in line is an Administration Preference 2 (AP2) field 1215. The AP2 field 1215 provides basically the same function as the AP1 field 1205 parameter, except that Lock Key 2 1220 parameter applies to the AP2 field 1215 parameter. For example, suppose a VPN has two major sites, denoted as Node A and Node B (and other minor nodes), attached to two separate BMs, denoted as BM1 and BM2, respectively. Because both of the BMs are equally qualified to become the root BM, they are assigned the same priority by placing the same value in AP1 field 1205 and the AP2 field 1215. Assume now that BM1 has a MAC address. BM1 is selected as root BM. In the future, if BM1 is disconnected from the network for any reason, BM2 will become the new root BM and have a higher priority. Then, if in the future, BM1 rejoins the network, it may not be advantageous to have BM1 as the rood BM. For instance, if the flow of packets is heavy through BM2, reassigning BM1 as the root directory may interrupt service on the network. By using the AP2 field 1215 parameter and the Lock Key 2 parameter, BM2 will have a higher priority and therefore remain as the root BM, thereby preventing any interruption in service.

The Geography Preference parameter 1225 allows a subscriber to select the root BM from a sub-network, rather than the main network. A VPN may contain a number of sub-networks. If the VPN is concentrated in one of the sub-networks, it would more efficient if a BM from that particular sub-network is chosen to be the root BM. The Geography Preference parameter 1225 along with the Lock Key 3 parameter 1230 are used to indicate which sub-network the root BM is located. The value of the Geography Preference parameter 1225 may be set either manually by the user via NMS or through an automated process. In one embodiment of the present invention, the Geography Preference parameter 1225 is automatically set using a VPN-ID assignment. Typically, the first N bits of the VPN-ID field can be used to indicate whether the VPN is located in a sub-network as opposed to the central network. For example, in a network consists a central network and four sub-networks, N, E, S and W, the first four bits may be use to identify the four sub-networks. For example, the value 000 may be used to indicate that the VPN is concentrated in the N sub-network. The value 0001 may be used to indicate that the VPN is concentrated in the E sub-network, the value 0010 may be used to indicate that the VPN is concentrated in the S sub-network, the value 0011 may be used to indicate that the VPN is concentrated in the W sub-network. If none of the sub-networks contain a VPN or each of the sub-networks contain a VPN and it does not make any difference as to which sub-network contains the root BM, then the first three bits may contain the value 1xx to indicate that there is no geographic preference. Alternatively, instead of using the VPN-ID field, the network administrator may manually set the geographic preference of the VPN through the network management system.

When a node is initialized, the user can input information on its Geographic location (which-sub-network that it belongs). If there is match between its geographic location and the preference indicated by VPN-ID, the BM sets the Geography Preference field 1225 to a higher priority. In many instances, the service provider network is hierarchical in nature. Thus, BMs that resided in nodes high in the hierarchical order are more efficient as a root BM. These nodes can also set this field with higher priority.

The Packet Processing field is used for multi-purpose nodes which contain multiple BMs to support multiple VPNs. As described above, a multi-purpose node may contain multiple BMs, each of which support a separate VPN. In each of these VPNs, the BM at the multi-purpose node may act as a root BM. However, due to the limited amount of resources, e.g., bandwidth, allotted to each multi-purpose node, there is a threshold number of root BMs that a single multi-purpose node may support. If the number of root-BM within a single multi-purpose node exceeds the threshold number, the value of the Priority Processing field may be reduced so that the likelihood that the BM in the multi-purpose node would be less likely to be selected to be the root BM. The threshold values are implementation specific. That is, bigger nodes maybe able to support more root BMs than smaller multi-purpose nodes. By setting Priority Processing field to a lower priority, a node will decrease its chance to become the root, but it may still be elected as a root BM.

The Bandwidth Availability parameter 1235 is used to indicate the amount of bandwidth available to the aggregated LSP between two particular multi-purpose nodes on the VPN. When the utilization of some these LSPs exceeds pre-selected threshold(s), the priority of this parameter will lower so that the BM in this node would be less likely to be selected to be the root BM.

Lastly, the Load Balancing parameter 1240 is used to insure that one BM is not overloaded with processing requirements. In most cases, the default value for this parameter will be used, and so it ends up the BM with the lowest MAC will become the root BM, until it is overloaded. To avoid having the same BM selected again and again as the root BM, a node will set the value of Load Balancing parameter 1240 to a higher priority if the last N bits match the last N bits of the VPN-ID. The number of bits, N, depends on the size of the network. The larger the VPN, i.e., the greater number of multi-purpose nodes, the greater number of bits, N, that are required. It should be noted that there are other parameters associated with the BP protocol that are not described here.

These parameters, which are not listed here, are used in their normal manner in accordance with the IEEE 802.1 standard.

Other alternative embodiments will become apparent to those skilled in the art to which an exemplary embodiment pertains without departing from its spirit and scope. Accordingly, the scope of the present invention is defined by the appended claims rather than the foregoing description.

We claim:

1. A processing unit for forwarding data packets over a bi-directional Label Switched Path (LSP) comprising at least one bridging module (BM) that:
    generates a spanning tree for a plurality of Virtual Private Networks (VPN) to indicate an optimal set of bi-directional LSPs;
    determines a number of active, bidirectional LSPs required to provide full network connectivity for all of the VPNs and inactive LSPs within the VPNs; and
    reallocates resources associated with inactive bi-directional LSPs for forwarding data packets.

2. The processing unit of claim 1, wherein the BM further receives packets from a subscriber, wherein the packets are based on a Layer-2 address.

3. The processing unit of claim 1, wherein the BM further generates a spanning tree for the VPNs to indicate an optimal set of active, bi-directional LSPs for transferring data packets between a plurality of BMs.

4. The processing unit of claim 3, wherein the BM further generates the spanning tree by:
    determining a root BM for each VPN; and
    determining a designated BM and a non-designated BM for pairs of BMs connected by an active, bi-directional LSP.

5. The processing unit of claim 4, wherein the BM further:
    determines whether a bi-directional LSP connection is active between two BMs;
    for the active bi-directional LSPs, performing a first sequence, comprising:
        sending a control message from the non-designated BM to the designated BM;
        setting a resource flag in the control message to a first value at the non-designated BM; and
        setting a flag at the designated BM to a first value indicating that the designated BM can receive information packets from the non-designated BM on the LSP connection; and
    for the inactive, bi-directional LSPs, performing a second sequence, comprising:
        setting the resource flag in the control message to a second value at the non-designated BM; and
        setting the flag at the designated BM to a second value indicating that the designated BM cannot receive information packets from the non-designated BM on the LSP connection.

6. The processing unit of claim 5, wherein the BM further:
    reallocates bandwidth associated with the bi-directional LSP between the non-designated BM and the designated BM; and
    maintains a control channel for transmitting the control messages.

7. The processing unit of claim 4, wherein the BM further determines a root BM by:
    determining an administrative priority field that specifies the priority for the BM to become the root BM in each VPN; and
    selecting the BM that has the highest priority.

8. The processing unit of claim 7, wherein the administrative priority field comprises:
    a plurality of administrative preference parameters used to identify the preference of the BM in becoming a root BM in each VPN; and
    a lock key parameter associated with at least one administrative preference parameter, wherein the lock key parameter is used to maintain the BM as the root BM.

9. The processing unit of claim 8, wherein the administrative preference parameter is selected from a group consisting of a geographic preference parameter, packet processing load parameter, a bandwidth availability parameter, and a load balancing parameter.

10. The processing unit of claim 4, wherein the BM further:
    determines bandwidth associated with the bi-directional LSPs in each VPN; and
    sums the inverse of the bandwidth associated with the bi-directional LSPs from the BM to the root BM.

11. The processing unit of claim 4, wherein the BM further:
    determines a total number of hops for the bi-directional LSP in each VPN; and
    calculates a hop count by summing hops from the BM to the root BM.

12. The processing unit of claim 3, wherein the BM further generates the spanning tree by setting the bi-directional LSPs between a root BM and non-root BMs as active.

13. The processing unit of claim 2 further comprising at least one interface operable to connect a Multi-Protocol Label Switching (MPLS) node to other MPLS nodes.

14. The processing unit of claim 13 wherein the interface is selected from a list consisting of a physical interface, a MPLS-LPS, and an Internet Protocol Security (IPSec) interface.

15. The processing unit of claim 3, wherein the data packet is encapsulated by an outer MPLS label and an inner MPLS label, wherein the outer MPLS label identifies a node and the inner MPLS label identifies a VPN.

16. A method for forwarding data packets over a bi-directional Label Switched Path (LSP) comprising:
    generating a spanning tree for a plurality of Virtual Private Networks (VPN) to indicate an optimal set of bi-directional LSPs;
    determining a number of active bi-directional LSPs required to provide full network connectivity and inactive LSPs within each VPN; and
    reallocating resources associated with inactive bi-directional LSPs for forwarding data packets.

17. The method of claim 16 further comprising receiving packets from a subscriber, wherein the packets are based on a Layer-2 address.

18. The method of claim 16 further comprising generating a spanning tree for each VPN to indicate the optimal set of active bi-directional LSPs for transferring a data packet between a plurality of BMs.

19. The method of claim 18 further comprising:
    determining a root BM for each VPN; and
    determining a designated BM and a non-designated BM for pairs of BMs connected by an active, bi-directional LSP.

20. The method of claim 19 further comprising:
    determining whether a bi-directional LSP connection is active between two BMs;
    for the active bi-directional LSPs, performing a first sequence, comprising:
        sending a control message from the non-designated BM to the designated BM;
        setting a resource flag in the control message to a first value at the non-designated BM;

setting a flag at the designated BM to a first value indicating that the designated BM can receive information packets from the non-designated BM on the LSP connection; and for the inactive bi-directional LSPs, performing a second sequence, comprising:

setting the resource flag in the control message to a second value at the non-designated BM; and setting the flag at the designated BM to a second value indicating that the designated BM cannot receive information packets from the non-designated BM on the LSP connection.

21. The method of claim 20 further comprising:

reallocating bandwidth associated with the bi-directional LSP between the non-designated BM and the designated BM; and maintaining a control channel for transmitting the control messages.

22. The method of claim 19, wherein determining the root BM comprises:

determining an administrative priority field that specifies the priority for the BM to become the root BM in each VPN; and selecting the BM that has the highest priority.

23. The method of claim 22, wherein the administrative priority field comprises:

a plurality of administrative preference parameters used to identity the preference of the BM in becoming a root BM in the VPN; and a lock key parameter associated with at least one administrative preference parameter, wherein the lock key parameter is used to maintain the BM as the root BM.

24. The method of claim 23, wherein the administrative preference parameter is selected from a group consisting of a geographic preference parameter, packet processing load parameter, a bandwidth availability parameter, and a load balancing parameter.

25. The method of claim 19, wherein generating the spanning tree comprises:

determining bandwidth associated with the bi-directional LSPs in the VPN; and summing the inverse of the bandwidth associated with the bi-directional LSPs from the BM to the root BM.

26. The method as in claim 19, wherein generating the spanning tree comprises:

determining a total number of hops for the bi-directional LSP in each VPN; and calculating a hop count by summing hops from the BM to the root BM.

27. The method of claim 18, wherein generating the spanning tree comprises setting the bi-directional LSPs between the root BM and non-root BMs as active.

28. The method of claim 17, further comprising connecting a Multi-Protocol Label Switching (MPLS) node to other MPLS nodes.

29. The method of claim 18, wherein the data packet is encapsulated by an outer MPLS label and an inner MPLS label, and wherein the outer MPLS label identifies a node and the inner MPLS label identifies a VPN.

* * * * *